US008621254B2

United States Patent
Roder et al.

(10) Patent No.: US 8,621,254 B2
(45) Date of Patent: Dec. 31, 2013

(54) ELECTRONIC APPARATUS HAVING REDUCIBLE POWER CONSUMPTION IN THE READINESS STATE

(75) Inventors: Annette Roder, Munich (DE); Mike Thoms, Germering (DE); Jurgen Brieskorn, Geltendorf (DE); Edmund Ernst, Munich (DE); Karl Klug, Miesbach (DE); Stephan Schaade, Buchloe (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 610 days.

(21) Appl. No.: 12/739,007

(22) PCT Filed: Nov. 25, 2008

(86) PCT No.: PCT/EP2008/066150
§ 371 (c)(1),
(2), (4) Date: Oct. 18, 2010

(87) PCT Pub. No.: WO2009/068527
PCT Pub. Date: Jun. 4, 2009

(65) Prior Publication Data
US 2011/0022863 A1 Jan. 27, 2011

(30) Foreign Application Priority Data

Nov. 30, 2007 (DE) .......................... 10 2007 057 668

(51) Int. Cl.
*G06F 1/00* (2006.01)
*G06F 1/26* (2006.01)
*G06F 1/32* (2006.01)
*H04M 1/00* (2006.01)

(52) U.S. Cl.
USPC ........... 713/322; 713/300; 713/320; 713/324; 379/900

(58) Field of Classification Search
None
See application file for complete search history.

(56) References Cited

U.S. PATENT DOCUMENTS 5,758,040 A * 5/1998 Ichimura et al. ............. 358/1.14
6,415,387 B1 * 7/2002 Aguilar et al. ............... 713/320
(Continued)

FOREIGN PATENT DOCUMENTS

DE 19717151 1/1998
WO 00/76177 A1 12/2000
(Continued)

OTHER PUBLICATIONS

International Search Report for PCT/EP2008/066150 dated Mar. 13, 2009 (Form PCT/ISA/210).

(Continued)

*Primary Examiner* — Ji H Bae
(74) *Attorney, Agent, or Firm* — Buchanan Ingersoll & Rooney PC

(57) ABSTRACT

Method for an electronic device (IT) that is controllable in at least one operating state (OP) and one standby state (SBY), with which a main processing unit (MPU) controls the operating state (OP) and a preprocessing unit (PPU) controls the standby state (SBY), such that, by means of the preprocessing unit (PPU), the main processing unit (MPU) and, to some extent, the functional units of the electronic device (IT) that are implemented by circuitry are switched by the control into at least one state having reduced energy consumption. An advantage can be seen in the fact that, by using a preprocessing unit (PPU), in the operating state of "standby" (SBY) the total energy consumption of the electronic device (IT) is reduced, both due to the significantly reduced energy consumption of a preprocessor (PPE) in the preprocessing unit (PPU) and to the units (MPU) that have been switched by the control into a state having reduced energy consumption, and the electronic device can therefore be operated more economically. An additional advantage is that the reduction of the energy consumption is achieved exclusively by circuitry measures and that no implementations must be included in the programs of the electronic device (IT).

14 Claims, 1 Drawing Sheet

(56) References Cited

U.S. PATENT DOCUMENTS

| | | | |
|---|---|---|---|
| 6,625,281 B1 * | 9/2003 | Bernard | 379/413 |
| 6,658,576 B1 * | 12/2003 | Lee | 713/320 |
| 6,725,060 B1 * | 4/2004 | Chhatriwala et al. | 455/556.2 |
| 6,880,093 B1 * | 4/2005 | Lyles | 713/300 |
| 6,976,180 B2 * | 12/2005 | Cupps et al. | 713/300 |
| 7,010,332 B1 * | 3/2006 | Irvin et al. | 455/575.2 |
| 7,058,829 B2 * | 6/2006 | Hamilton | 713/320 |
| 7,231,531 B2 | 6/2007 | Cupps et al. | |
| 7,233,660 B2 * | 6/2007 | Everett et al. | 379/413 |
| 2004/0121797 A1 | 6/2004 | Gupta | |
| 2005/0221860 A1 | 10/2005 | Yamaji | |
| 2007/0140199 A1 | 6/2007 | Zhao et al. | |
| 2008/0247401 A1 * | 10/2008 | Bhal et al. | 370/401 |

FOREIGN PATENT DOCUMENTS

| | | |
|---|---|---|
| WO | 01/63888 A1 | 8/2001 |
| WO | 02/075517 A2 | 9/2002 |
| WO | 2007/100961 A2 | 9/2007 |

OTHER PUBLICATIONS

Written Opinion of the International Searching Authority for PCT/EP2008/066150 dated Mar. 13, 2009.

International Preliminary Report on Patentability for PCT/EP2008/066150 (Form PCT/IB/373 and PCT/ISA/237) (German).

International Preliminary Report on Patentability for PCT/EP2008/066150 (Form/IB/338, Form PCT/IB/373 and PCT/ISA/237) (English Translation).

* cited by examiner

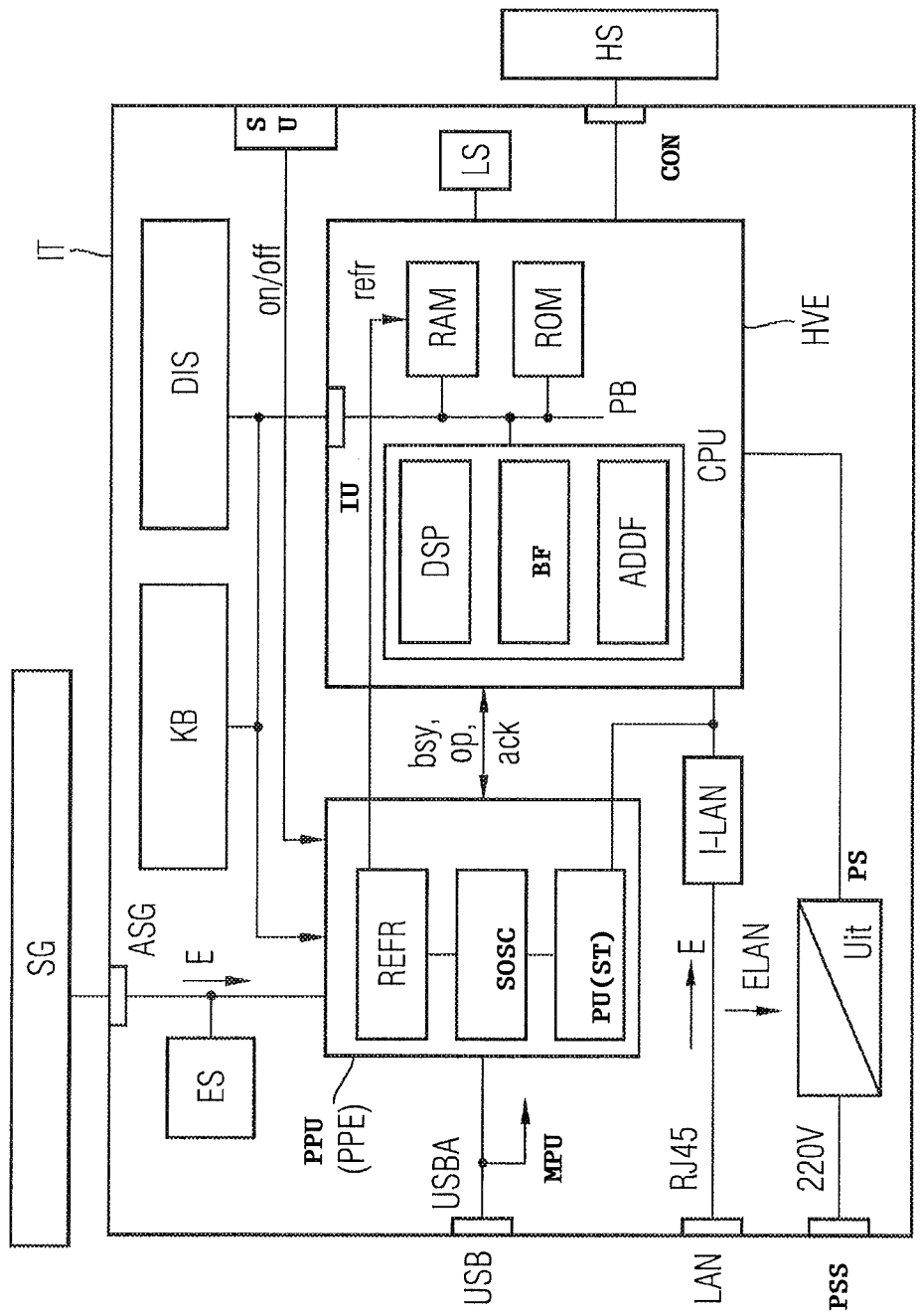

ELECTRONIC APPARATUS HAVING REDUCIBLE POWER CONSUMPTION IN THE READINESS STATE

CROSS-REFERENCE TO RELATED APPLICATIONS

This application is the United States national phase under 35 U.S.C. §371 of PCT International Application No. PCT/EP2008/066150, filed on Nov. 25, 2008, and claiming priority to German Application No. 10 2007 057 668.6, filed on Nov. 30, 2007. Both applications are incorporated by reference herein.

BACKGROUND OF THE INVENTION

1. Field of the Invention

Embodiments of the invention relate to methods for processor-controlled electronic devices which allow their energy consumption to be reduced, particularly in standby mode.

2. Background of the Art

In communications networks, for example, in the PSTN or the packet-oriented Intranet or Internet, wired communications terminals, such as, telephones or fax machines, are frequently used. Due to their connection via modem to the communications networks and their construction with displays and other applications, as well as with a standby state or standby operation, these wired communications terminals are reliant upon a mostly continuous energy supply from a power supply system. In contrast to mobile, mostly battery-operated mobile communications terminals, the costs for energy consumption by wired communications terminals are therefore continuously increasing due to increasing energy usage. The cost increase also applies to all electronic, mostly processor-controlled devices that are supplied with power from a public or private power supply system.

With processor-controlled electronic devices, program-implemented methods are currently being used in which subsystems that are not required during the standby state are inactivated by the control, in order to lower energy consumption. With such solutions, schedulers are generally provided that receive information about the current operating states of the device and, using this information, switch the device by means of the control into the current states, i.e., also into an energy savings mode, when the device is on standby. This means that, particularly with processor-controlled communications terminals, the main processing unit is always active and a significant reduction in energy consumption is prevented.

BRIEF SUMMARY OF INVENTION

An aspect of the method according to the invention can be seen in the fact that, in the case of an electronic device that is controllable in at least one operating state and one standby state, a main processing unit controls the operating state, and a preprocessing unit controls a standby state, such that, by means of the preprocessing unit, the main processing unit and, at least to some extent, the functional units of the electronic device are switched by the control into at least one state having reduced energy consumption. In the standby state (SBY), input/activation/communications network interface units (KB, SU, USBA, ILAN) are monitored by the preprocessing unit, and upon determining an indication for the need to change over to the operating state on one of the units, the main processing unit and the functional units of the electronic device, which are implemented by means of circuitry and have been switched by the control into a state having low energy consumption, are switched by the control into a state not having low energy consumption.

A basic advantage of the invention can be seen in the fact that, particularly by using a preprocessing unit, especially in the case of processor-controlled devices of the preprocessor, in the operating state of "standby", the total energy consumption of the electronic device or a communications terminal is reduced, and the electronic device can therefore be operated more economically, both due to the significantly reduced energy consumption of the preprocessor and the switching of the main processing unit or the main processor, as well as to some extent the functional units of the electronic device, e.g., a display unit, into a state having reduced energy consumption. Another advantage of the invention is that the reduction in energy consumption is achieved exclusively by circuitry measures, therefore requiring no knowledge of the existing circuitry structure in the existing programs, and, in addition, no implementations must be included in the programs or software for reducing the energy consumption of an electronic device.

Advantageously, the main processing unit is switched by the control into a state having reduced energy consumption, and the affected functional units of the electronic device, to the extent that they are needed for maintaining a standby state, are switched by means of circuitry into a state having reduced energy consumption. A reduction in the energy consumption can hereby be achieved by reducing the processing speed or the clock rate of a main processing unit or a main processor or by lowering the supply voltage, also for the functional units, especially since the functional units implemented by circuitry can also be implemented by processors or microprocessors. In a standby state, the main processor and the functional units can be controlled by a protocol-compatible signal exchange between the preprocessing unit and the main processor or the functional units.

Advantageously, energy is sent by the control to the electronic device from one of the energy-generating units that is not dependent upon a power supply system. The energy-generating unit is advantageously dimensioned in such a way that the generated energy is sufficient for supplying energy to the electronic device when it is in the standby state, wherein the energy-generating unit is switched by the control to the electronic device during the initialization of the standby state. Such an energy-generating device is, e.g., a solar-cell unit or a solar generator with an appropriately dimensioned energy storage. The solar cell unit is dimensioned in such a way that the standby state of the communications device can be maintained without energy being supplied from a power supply system. Since the solar cell unit can also be provided to supply energy during the operating state, the energy costs can be further reduced.

Advantageously, at least one additional operating and/or standby state can be provided, wherein the electronic device is controlled in such a way by the main processing unit and the preprocessing unit that the main processing device and the functional units of the electronic device implemented by circuitry are supplied only with the amount of energy that is required for achieving the respective operating or standby states. By implementing additional operating or standby states, the energy consumption can be gradually adapted in a more differentiated manner to the currently required operating states and thereby reduced overall, making it possible to achieve a differentiated reduction in energy costs.

Additional advantageous further embodiments of the method according to the invention and a construction of an electronic device according to the invention can be found in the other claims.

The invention and its other embodiments are explained in more detail below with the aid of a drawing.

BRIEF DESCRIPTION OF THE FIGURE

The FIGURE shows a schematic diagram of the components of a communications device.

DETAILED DESCRIPTION OF THE INVENTION

In the embodiment, it is assumed that the communications device is implemented by an Internet telephone IT, which is connected to a local area network LAN. The method according to the invention is advantageous for all communications network communications terminals that are controlled by at least one processor. The Internet telephone IT has two processing units, a preprocessing unit PPU and a main processing unit MPU. In the embodiment, the preprocessing unit PPU is implemented by a preprocessor PPE that has only the functions required for controlling the Internet telephone IT in an operating or standby state OP, SBY, also known in professional circles as operating mode and standby mode. Advantageously, according to the invention, a preprocessor PPE is selected that has low energy consumption, in order to keep the energy requirements of the Internet telephone IT as low as possible in the standby state SBY.

The main processing unit MPU is a standard processor CPU, which, with regard to its technical features, such as, processing speed and resource management, is adapted to the requirements of the Internet telephone IT in the operating state. For the embodiment, it is assumed that three essential functions are implemented in the processor CPU, wherein the programs thereby required are stored in a ROM storage ROM. The first function is a digital signal processor DSP that is responsible for generating and processing the signals transmitted to and from the local area network LAN. Another function implements or controls the basic function BF of the Internet telephone IT, for example, the control of a display DIS and the telephone function with regard to the voice signals that are transmitted by both the local area network LAN and a handset HS. Another function is provided for implementing additional functions ADDF, wherein additional functions are shown, for example, as performance features or special display functions. A RAM storage RAM for storing data is arranged in the main processing unit MPU, wherein the processor CPU and the two storages RAM, ROM are connected to or communicate via the processor bus PB.

A display unit DIS, as well as an input unit KB, is connected to the main processing unit MPU via an interface unit IE IU, generally implemented by a telephone keyboard and keys for performance features. In the case of an Internet telephone IT, the main processing unit MPU comprises a physical connection CON for a handset HS, customarily implemented by a telephone receiver, as well as a loud speaker LS, which makes call signals or hands-free talking possible. Furthermore, a sensor unit SU is connected to both the main processing unit MPU and the preprocessor PPE, which, depending upon whether the handset HS is on-hook or off-hook, signals an on-hook or off-hook state on, off of the main processing unit MPU and the preprocessor PPE.

In the operating state OP or in the operating mode, the Internet telephone IT is supplied with electrical energy via a power supply PS, wherein the power supply PS obtains 220V energy from the power supply system PSS via a 220V connector. The power supply also adjusts the voltage of the power supply system PSS to the internally required voltages for the processors PPE, CPU and the other functional units (not shown in the FIGURE). The Internet telephone IT can also be at least partially supplied with energy that is transmitted by the local area network LAN, shown in the FIGURE by an arrow labeled ELAN. The connection to the local area network LAN is customarily implemented by means of a LAN plug connector RJ45 according to the plug standard RJ45. In the network connector unit ILAN that is downstream from the plug connector RJ45, following an electrical isolation and an electrical adaptation, the signals transmitted by the local area network LAN are transmitted to the preprocessor PPE and to the main processing unit MPU and vice versa.

The preprocessor PPE is also connected to an energy storage ES and, via a connector ASG to a solar generator SG. The energy storage ES can be storage batteries or a capacitor, known in professional circles as a Goldcap. Solar generators SG are customarily made with solar cells that are integrated into a solar cell module. The solar generator SG and the energy storage ES are dimensioned in such a way that, in the standby state SBY or standby mode, the Internet telephone IT can be supplied with energy at least for a predetermined period of time. As described, the solar generator SG can be connected to a connector ASG of the Internet telephone IT as an external unit or integrated into the surface of the Internet telephone IT.

For the connector of external devices, such as, an additional display unit, a USB interface USBA is provided that is connected both to the preprocessor PPE and to the main processing unit MPU, with the connection to the main processing unit MPU being indicated in the FIGURE by an arrow labeled MPU.

The preprocessor PPE monitors all functions, or the information transmitted by these functions, that must be taken into account for controlling the Internet telephone IT in a standby state SBY or an operating state OP. In particular, the following functions are monitored:

Is the handset in the on-hook or off-hook state on, off?

Has a key been pressed within a predetermined period of time?

Is a signal or information being transmitted to the Internet telephone IT via one of the interfaces RJ45, USB?

Other functions that are not shown in the FIGURE, but that can be taken into account for controlling the Internet telephone IT in a standby state SBY or operating state OP, are, for example, proximity sensors or motion detectors that indicate when a person or a person's finger nears or withdraws from the Internet telephone IT.

The switching to a standby state or an operating state SBY, OP by the control can, in principle, be performed by the main processing unit MPU or the preprocessor PPE. Advantageously, the preprocessor PPE performs the switching into the standby or operating state SBY, OP, since the controlling or monitoring in the standby state SBY must be performed by the preprocessor PPE, and a complex switching of the control from the main processing unit MPU to the preprocessor PPE, and vice versa, is avoided.

For the embodiment, it is assumed that the Internet telephone IT is in the operating state OP, i.e., a telephone conversation from this Internet telephone IT is currently being conducted with another Internet telephone IT (not shown). This means that the sensor unit SU signals the off-hook state off of the handset HS, and the connector unit ILAN also reports that data packets are currently being transmitted to and from the local network. In the operating state OP, for example, the processor CPU or the main processing unit MPU, the preprocessor PPE, and all other components of the Internet telephone IT are supplied with energy E from the power supply system ENV via the power supply PS. In the operating state OP, all circuitry-related components, as well as all functions of the Internet telephone IT, are supplied with energy E, and all functions, for example, performance features, loud speaker, etc., can be activated or used.

For the embodiment, it is now assumed that the telephone conversation has ended and the handset HS is on-hook. The sensor unit SU reports this state change to the preprocessor PPE as on-hook state ON. It is also assumed that no other telephone conversation is being signaled to the Internet telephone IT via the local area network LAN. This state ST of the local area network LAN is determined by a processing unit PU implemented in the preprocessor PPE, wherein the data packets transmitted via the network connector unit ILAN are monitored by the processing unit PU for the existence of a signal or voice or data information.

After the processing unit PU of the preprocessor PPE has determined that no telephone conversation is currently being conducted or that no other call is being signaled, the Internet telephone IT can be switched by the control into a standby state SBY immediately or after a predetermined period of time or even within predetermined time ranges. The predetermined time period or time range can be selected depending upon the usage habits of the Internet telephone IT user, for example, usage frequency, operating times, etc. The Internet telephone IT is switched by the preprocessor PPE from an operating state into a standby state OP, SBY, wherein the standby state SBY is advantageously implemented in such a way that the lowest amount of energy E possible, or no energy E at all, has to be drawn from the power supply system PSS.

This is achieved by having the preprocessor PPE assume only the controlling function and tasks that are necessary for maintaining the standby state SBY. This means that all circuitry-related components that are not needed for maintaining the standby state SBY are switched off or at least switched by the control into a state having reduced energy consumption. With the transmission of a state signal sby indicating the standby state SBY, the processor CPU in the main processing unit MPU is alerted that it is to be switched by the control into a standby or idle mode. In the main processing unit MPU, for example, a standby mode can be initiated or achieved by reducing the input voltages or the clock rates of the power supply. The energy consumption of the main processing unit MPU can hereby be significantly reduced. When the standby and operating states SBY, OP are controlled by the preprocessor PPE and the main processing unit MPU, the states of the Internet telephone IT are adjusted or negotiated by the state signals sby, op, ack that are requesting the standby or operating state SBY, OP and acknowledging the requested states, as indicated in the FIGURE by the arrow labeled sby, op, ack. A standby/operating state control SOSC is provided in the preprocessor PPE for generating and processing the state signals sby, op, ack, wherein, in the embodiment, all functions of the preprocessor PPE are controlled by the standby/operating state control SOSC.

When controlling is performed by the preprocessor PPE, this preprocessor is also responsible for maintaining the programs contained in the RAM storage RAM, which, when DRAM storage is used, includes a refresh unit REFR and a refresh control, indicated in the FIGURE by an arrow labeled refr.

Since, as already mentioned, the preprocessor PPE has low energy consumption and the other circuitry-related components are controlled with low energy consumption in an idle or a standby state SBY, the energy consumption for the Internet telephone IT is significantly reduced in the standby state SBY, which results in considerable energy savings for an Internet telephone IT that is in a standby state SBY for extensive time ranges, i.e., with few telephone conversations within a day or week. In this way, an Internet telephone IT can be operated considerably more economically.

The energy consumption from the power supply system PSS can be further reduced or eliminated for an Internet telephone IT in the standby state SBY if the energy storage ES is used in conjunction with the solar generator SG. For this, the solar generator SG and the energy storage ES must be dimensioned in such a way that the Internet telephone IT in the standby state SBY, or standby mode, can be supplied with energy E' at least for a predetermined period of time. The predetermined period of time is, once again, dependent upon the usage habits of the Internet telephone IT user, for example, usage frequency during the day or at night. When dimensioning the solar generator SG and the energy storage ES, one must take into account the extent to which a solar generator SG can be integrated into the Internet telephone IT or whether an external solar generator SG is advantageous. The economic cost for a solar generator SG must also be considered. The solar generator SG with the energy storage ES can also be used to supply energy during the operating state OP of the Internet telephone IT, although this would shorten the time period in which the Internet telephone IT in the standby state SBY can be supplied with energy E' solely by the solar generator SG. Using a solar generator SG achieves an overall reduction in energy consumption from the power supply network PSS.

In the standby state SBY, the preprocessor PPE monitors all of the functions, or information displayed by these functions, that must be taken into account for switching the Internet telephone IT from the standby state SBY into the operating state OP. These particularly include:

Is the handset in the on-hook or off-hook state on, off?

Has a key been pressed within a predetermined period of time?

Is a signal or information being transmitted to the Internet telephone IT via one of the interfaces RJ45, USB?

Other functions that are not shown in the FIGURE, but that can be taken into account for the controlling of the Internet telephone IT in a standby state SBY or operating state OP, are, for example, proximity sensors or motion detectors that indicate when a person or a person's finger nears or withdraws from the Internet telephone IT.

If one of the monitored functions indicates an activity or the need to switch into the operating state, then, by means of the respective state signals sby, op, ack via the preprocessor PPE, the main processing unit MPU is switched again by the control into the operating state OP, i.e., the measures reducing energy consumption are cancelled.

The method according to the invention is not limited to the embodiment, but can rather be used in all processor-controlled electronic devices or equipment in which an operating state and standby state SBY having reduced functions are provided, and in which a substantial portion of the total operating time of the respective electronic device is in the standby state SBY. Such devices particularly include all wired communications terminals of communications networks, as well as transmission devices and access devices, such as, traffic concentrations, multiplexers, and communications network routers.

The invention claimed is:

1. A method for operating an electronic device of a communication network that is controllable at least into a first operational state and a second operational state, the electronic device requiring a first amount of power when operating in the first operational state and a second amount of power when operating in the second operational state, the first amount of power being greater than the second amount of power, the method comprising:
   a first processing unit of the electronic device controlling the electronic device when the electronic device operates in the first operational state;
   a second processing unit controlling the electronic device when the electronic device operates in the second operational state such that the first processing unit and functional units of the electronic device implemented in circuitry of the electronic device are controlled into a state with reduced power consumption;
   when in the second operational state, monitoring at least one input unit of the electronic device, at least one activation unit of the electronic device, and at least one communication network interface unit of the electronic device to detect a first indication, the first indication indicating a need for a transition to the first operational state; and
   in response to detecting the first indication, switching the electronic device into the first operational state;
   when the electronic device is in the first operational state, monitoring the at least one input unit, the at least one activation unit, and the at least one communication network interface unit to detect a second indication, the second indication indicating when the electronic device is not in use for a telephone call and that no telephone call is being signaled by the electronic device;
   upon determining that the electronic device is not in use for a telephone call and that no telephone call is being signaled by the electronic device, switching the electronic device into the second operational state; and
   wherein the second processing unit performs the monitoring of the at least one input unit, the at least one activation unit, and the at least one communication network interface unit to detect the second indication and the second processing unit causes the switching of the electronic device into the second operational state upon determining that the electronic device is not in use for a telephone call and that no telephone call is being signaled by the electronic device.

2. The method of claim 1 wherein switching the electronic device into the second operational state further comprises switching a power supply for the electronic device from a first power supply to a second power supply, the second power supply being a solar generator that generates power from solar energy.

3. The method of claim 2 wherein the second power supply is the lone power source for the electronic device when the electronic device is in the second operational state.

4. The method of claim 1 wherein a first power supply provides power to the electronic device when the electronic device is in the first operational state and the second power supply also provides power to the electronic device when the electronic device is in the first operational state.

5. The method of claim 4 further comprising switching a supply of power to the electronic device such that the second power supply is the lone power source for the electronic device when the electronic device is in the second operational state, wherein the second power supply is a solar generator that generates power from solar energy or is a solar cell.

6. The method of claim 5 wherein the second power supply is independent of the first power supply and the second power supply is connected to the electronic device.

7. The method of claim 1 wherein the at least one activation unit is comprised of a detector that detects whether a handset of the electronic device is in an on-hook or off-hook state.

8. The method of claim 1 wherein the at least one activation unit is comprised of a proximity sensor or a motion detector that indicates when a finger of a user is near the electronic device.

9. The method of claim 1, wherein at least one of:
   the first processing unit operates at a reduced clock rate,
   at least one of the functional units are inactivated, and
   at least one of the functional units having partially reduced functionality, when the electronic device is in the second operational state.

10. An electronic device having a first operational state and a second operational state, the electronic device requiring a first amount of power when operating in the first operational state and a second amount of power when operating in the second operational state, the first amount of power being greater than the second amount of power, the electronic device comprising:
    a first processor;
    a second processor;
    a solar generator that generates power for the electronic device;
    at least one unit selected from the group of units consisting of an input unit, an activation unit, and a communications interface unit, the at least one unit connected to the first processor and the at least one unit connected to the second processor; and
    a non-transitory computer-readable medium storing instructions executed by the first and second processors to carry out the steps of:
       the first processor controlling the electronic device when the electronic device operates in the first operational state;
       the second processor controlling the electronic device when the electronic device operates in the second operational state such that the first processor is controlled into a state with reduced power consumption;
       when in the second operational state, the second processor monitoring the at least one unit to detect a first indication, the first indication indicating a need for a transition to the first operational state; and
       in response to detecting the first indication, the second processor switching the electronic device into the first operational state;
       when the electronic device is in the first operational state, the second processor monitoring the at least one unit to detect a second indication, the second indication indicating when the electronic device is not in use for a telephone call and that no telephone call is being signaled by the electronic device; and
       upon determining that the electronic device is not in use for a telephone call and that no telephone call is being signaled by the electronic device, the second processor switching the electronic device into the second operational state.

11. The electronic device of claim 10 wherein the second processor switches power supply for the electronic device from a first power supply to the solar generator when the electronic device is switched to the second operational state.

12. The electronic device of claim 11 wherein the solar generator is the lone power source for the electronic device when the electronic device is in the second operational state.

13. The electronic device of claim 11 wherein the first power supply provides power to the electronic device when the electronic device is in the first operational state and the solar generator also provides power to the electronic device when the electronic device is in the first operational state.

14. The electronic device of claim 13 wherein the solar generator is a solar cell that generates power from solar energy.

* * * * *